US012456818B2

(12) United States Patent
Takata et al.

(10) Patent No.: US 12,456,818 B2
(45) Date of Patent: Oct. 28, 2025

(54) ANTENNA AND BEAM FORMING METHOD

(71) Applicant: NEC Corporation, Tokyo (JP)

(72) Inventors: Koya Takata, Tokyo (JP); Kenji Wakafuji, Tokyo (JP); Fujio Okumura, Kanagawa (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/274,676

(22) PCT Filed: Feb. 3, 2022

(86) PCT No.: PCT/JP2022/004276
§ 371 (c)(1),
(2) Date: Jul. 27, 2023

(87) PCT Pub. No.: WO2022/209276
PCT Pub. Date: Oct. 6, 2022

(65) Prior Publication Data
US 2024/0088569 A1 Mar. 14, 2024

(30) Foreign Application Priority Data
Mar. 29, 2021 (JP) ................................ 2021-056223

(51) Int. Cl.
*H01Q 15/02* (2006.01)
*H01Q 3/44* (2006.01)

(52) U.S. Cl.
CPC .............. *H01Q 15/02* (2013.01); *H01Q 3/44* (2013.01)

(58) Field of Classification Search
USPC .......................................................... 343/833
See application file for complete search history.

(56) References Cited

U.S. PATENT DOCUMENTS

2014/0266897 A1 9/2014 Jakoby et al.
2017/0302004 A1* 10/2017 Stevenson ............ H01Q 21/065
2018/0076521 A1* 3/2018 Mehdipour ............ H01Q 5/335
2021/0050671 A1 2/2021 Stevenson et al.
2021/0080626 A1* 3/2021 Radivojevic ......... H01Q 15/165

FOREIGN PATENT DOCUMENTS

JP 2013-539949 A 10/2013
JP 2014-531843 A 11/2014
JP 2019-533925 A 11/2019

OTHER PUBLICATIONS

International Search Report for PCT Application No. PCT/JP2022/004276, mailed on Apr. 5, 2022.
JP Office Action for JP Application No. 2023-510568 , mailed on Oct. 15, 2024 with English Translation.

* cited by examiner

*Primary Examiner* — Dimary S Lopez Cruz
*Assistant Examiner* — Brandon Sean Woods

(57) ABSTRACT

To provide an antenna capable of accelerating beamforming. The antenna includes a metasurface with an opening part that receives electromagnetic waves and a MEMS mechanism configured to change a shape of the opening part by operating a moveable member with respect to the opening part of the metasurface.

5 Claims, 8 Drawing Sheets

ANTENNA AND BEAM FORMING METHOD

This application is a National Stage Entry of PCT/JP2022/004276 filed on Feb. 3, 2022, which claims priority from Japanese Patent Application 2021-056223 filed on Mar. 29, 2021, the contents of all of which are incorporated herein by reference, in their entirety.

TECHNICAL FIELD

The present disclosure relates to an antenna and a beam forming method.

BACKGROUND ART

Antennas that perform beam forming using liquid crystal are known (see, for example, Patent Literature 1).

CITATION LIST

Patent Literature

Patent Literature 1: Published Japanese Translation of PCT International Publication for Patent Application, No. 2014-531843

SUMMARY OF INVENTION

Technical Problem

In the aforementioned antenna, the beamforming may be slowed down due to the slow operation speed of the liquid crystal.

An object of the present disclosure is to provide an antenna and a beam forming method that solve the aforementioned problem.

Solution to Problem

An aspect of achieving the aforementioned object is an antenna comprising:

a metasurface having an opening part that receives electromagnetic waves; and a MEMS mechanism configured to change a shape of the opening part by operating a moveable member with respect to the opening part of the metasurface.

Another aspect of achieving the aforementioned object may be a beam forming method comprising changing an aperture shape of an opening part by moving a moveable member with respect to an opening part of a metasurface using a MEMS mechanism, thereby changing resonance conditions of the opening part and the moveable member and changing an electromagnetic radiation pattern radiated from the opening part.

Advantageous Effects of Invention

According to the present disclosure, an antenna and a beam forming method that solve the aforementioned problem can be provided.

EXAMPLE EMBODIMENT

First Example Embodiment

Figure 1:
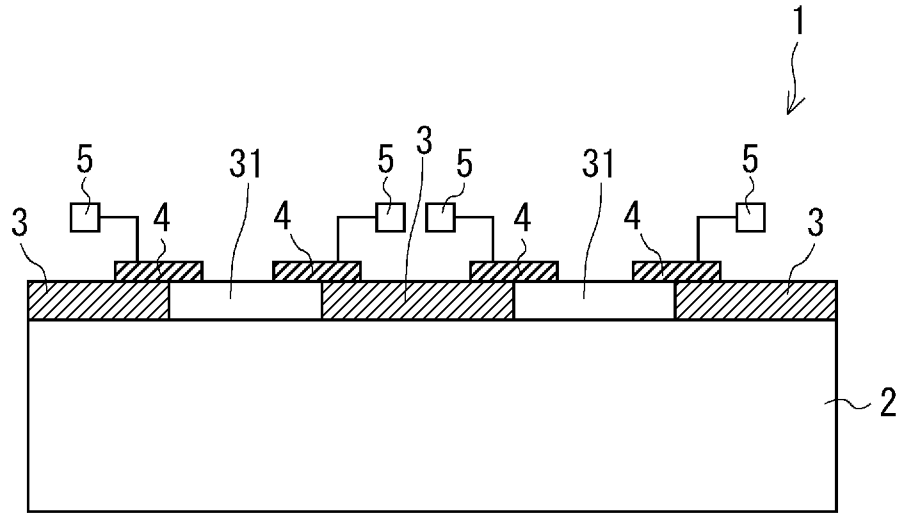
FIG. 1 is a diagram showing a schematic configuration of an antenna according to an example embodiment.

The present example embodiment will be described below with reference to the drawings. FIG. 1 is a diagram showing a schematic configuration of an antenna according to the present example embodiment. An antenna 1 according to the present example embodiment is equipped with a traveling wave tube 2 through which electromagnetic waves travel, a metasurface 3 provided on the traveling wave tube 2, a moveable member 4 provided on the metasurface 3, and a MEMS mechanism 5 that operates the moveable member 4.

The metasurface 3 has a multilayered structure, and at the top of the metasurface 3, at least one opening part 31 that receives electromagnetic waves is formed. The metasurface 3 has a plurality of opening parts formed, for example, in an array. While only the opening part 31 is shown in FIG. 1 for the sake of simplicity, in the actual configuration, the multilayered structure of the metasurface 3 exists beneath the opening part 31.

The opening part 31 of the metasurface 3 is provided with at least one moveable member 4 that is operated with respect to the opening part 31. The moveable member 4 is made of metals or other materials that affect electromagnetic waves. The moveable member 4 is equipped with the MEMS mechanism 5 that operates the moveable member 4.

Here, a beam forming method according to the present example embodiment will be described. The MEMS mechanism 5 changes the aperture shape of the opening part 31 by operating the moveable member 4 with respect to the opening part 31 of the metasurface 3. Thus, beamforming can be performed by changing resonance conditions of the opening part 31 and the moveable member 4 and by changing the radiation pattern of the electromagnetic waves emitted from the opening part 31.

More specifically, the MEMS mechanism 5 of each opening part 31 performs beamforming by changing the aperture shape of each opening part 31 and changing the resonance conditions of each opening part 31 and each moveable member 4, thereby controlling the intensity of the electromagnetic waves emitted from each opening part 31.

For example, the shape of the opening part 31, the number of the opening parts 31, the shape of the moveable member 4, the number of the moveable members 4, the operation method of the moveable member 4, etc. are determined by design according to the desired electromagnetic radiation pattern.

The MEMS (Micro Electro Mechanical Systems) mechanism is a device with a micron-level structure in which sensors, actuators, electronic circuits, etc. of the mechanical component parts are integrated into a semiconductor silicon substrate, a glass substrate, and organic material, etc. It is advantageous to use such an elaborate MEMS mechanism 5 because the wire becomes thinner as the frequency increases.

The MEMS mechanism 5 is driven by a TFT (thin-film-transistor) or the like. The MEMS mechanism 5 has features that enable the moveable member 4 to move by an infinitesimal distance and at a high speed. In the antenna according to the present example embodiment, the shape of the opening part 31 is changed by having the moveable member 4 operate at a high speed using the high-speed operation features of the MEMS mechanism 5 described above.

This allows accelerated beamforming by changing the resonance conditions of the opening part 31 and the moveable member 4 and changing the electromagnetic radiation patterns emitted from the opening part 31 at high speed. Therefore, the antenna can be applied not only to satellite communication but also to a wide range of applications such as front holes for performing high-speed beamforming.

Figure 2:
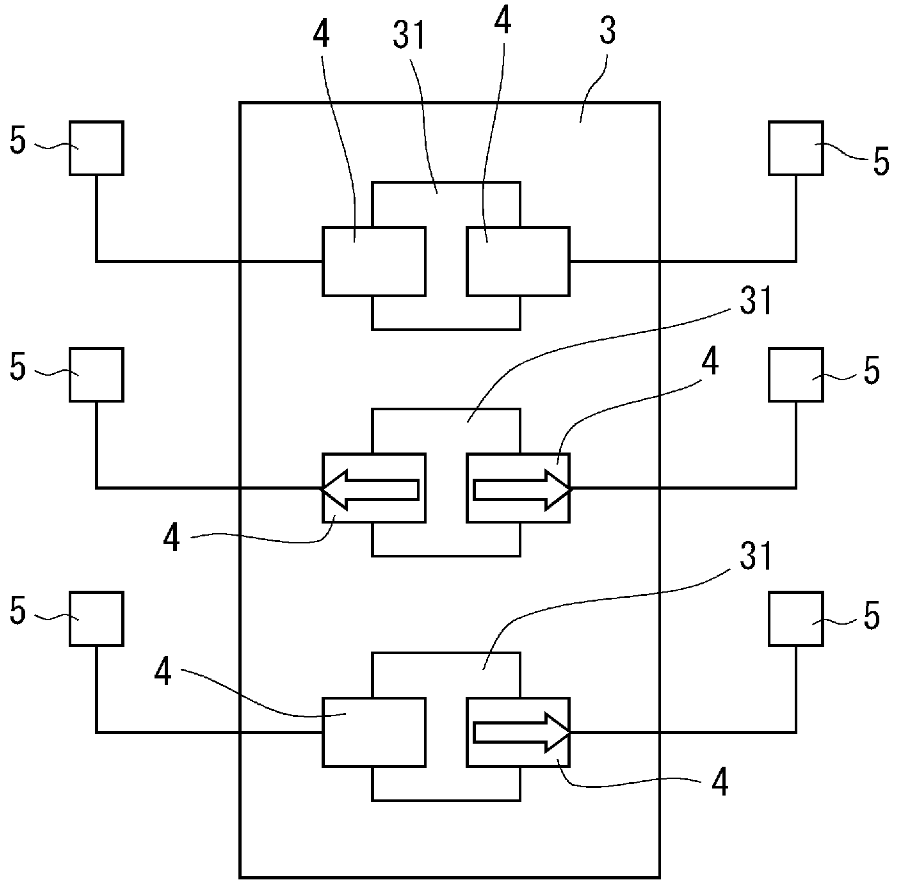
FIG. 2 is a diagram showing an operation of a moveable member.

FIG. 2 shows an operation of a moveable member. The moveable member 4 is provided in the opening part 31 of the metasurface 3. The moveable member 4 is provided so as to be movable in a parallel direction with respect to the opening part 31. The moveable member 4 covers at least a part of the opening part 31.

The MEMS mechanism 5 changes the aperture shape of the opening part 31 by moving the moveable member 4 in a parallel direction with respect to the opening part 31, thereby changing the resonance conditions of the moveable member 4 and the opening part 31. The MEMS mechanism 5 uses, for example, electrostatic force to move the moveable member 4 in a parallel direction with respect to the opening part 31.

As shown in FIG. 2, each opening part 31 is provided with a pair of the moveable members 4, but only one moveable member 4 may be provided. Each MEMS mechanism 5 may move both of the pair of the moveable members 4, or may move only one of the pair of the moveable members 4.

Figure 3:
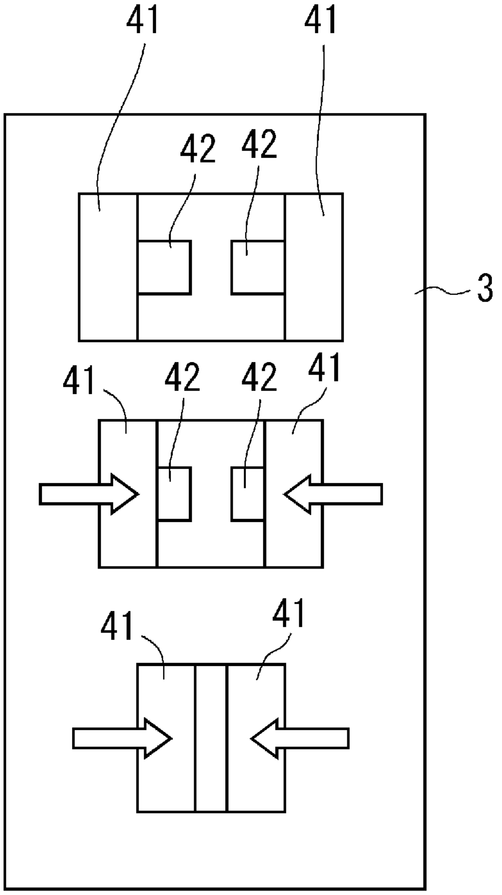
FIG. 3 is a diagram showing an example of a moveable member combined with a plurality of members.

FIG. 3 is a diagram showing an example of the moveable member 4 combined with a plurality of members. Each moveable member 4 may be configured by combining a plurality of members. For example, as shown in FIG. 3, each moveable member 4 may have a first moveable part 41 and a second moveable part 42 moving relative to the first moveable part 41 in a parallel direction. The MEMS mechanism 5 moves the first and second moveable parts 41 and 42 in a parallel direction with respect to the opening part 31. Thus, the aperture shape of the opening part 31 can be varied in many ways.

Here, the MEMS mechanism 5 displaces the moveable member 4 by only a few micrometers, but the metasurface 3 is sensitive to shape changes. Therefore, the resonance conditions of the moveable member 4 and the opening part 31 can be efficiently changed only by the infinitesimal displacement of the moveable member 4.

By causing infinitesimal displacement of the moveable member 4 in a parallel direction with respect to the opening part 31 as described above, the MEMS mechanism 5 switches between a radiation state in which the electromagnetic waves are radiated outward from inside the traveling wave tube 2 through the opening part 31 of the metasurface 3 and a non-radiation state in which the electromagnetic waves are not radiated outward from inside the traveling wave tube 2 through the opening part 31 of the metasurface 3.

Figure 4:
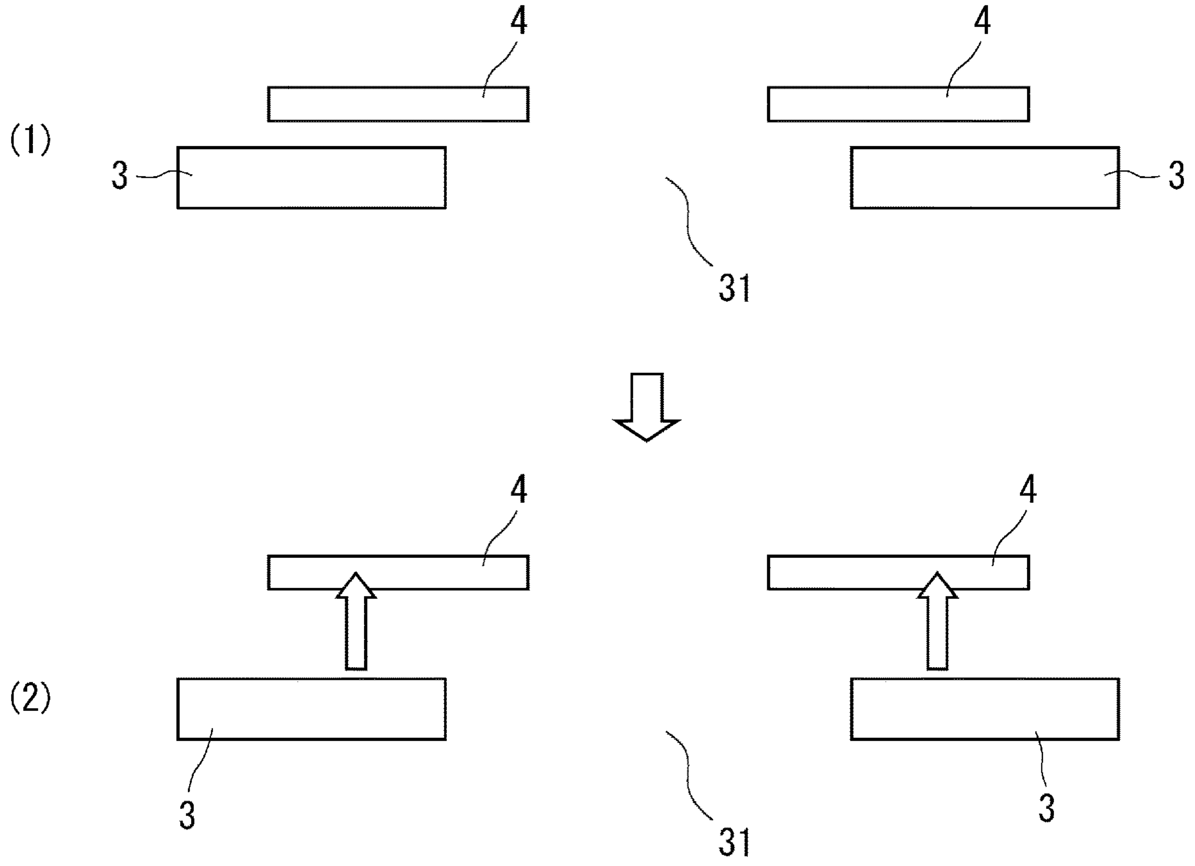
FIG. 4 is a diagram showing a configuration in which a moveable member is moved in a vertical direction with respect to an opening part.

FIG. 4 shows a configuration in which a moveable member is moved in a vertical direction with respect to the opening part. The MEMS mechanism 5 may change the aperture shape of the opening part 31 by moving the moveable member 4 in a vertical direction with respect to the opening part 31 as shown in FIG. 4, thereby changing the resonance conditions of the moveable member 4 and the opening part 31.

The MEMS mechanism 5, for example, causes infinitesimal displacement of the moveable member 4 of the opening part 31 of the metasurface 3 in an upward vertical direction to switch from a non-radiant state (1) in which electromagnetic waves are not radiated from inside the traveling wave tube 2 through the opening part 31 of the metasurface 3 to a radiant state (2) in which electromagnetic waves are radiated from inside the traveling wave tube 2 through the opening part 31 of the metasurface 3.

Figure 5:
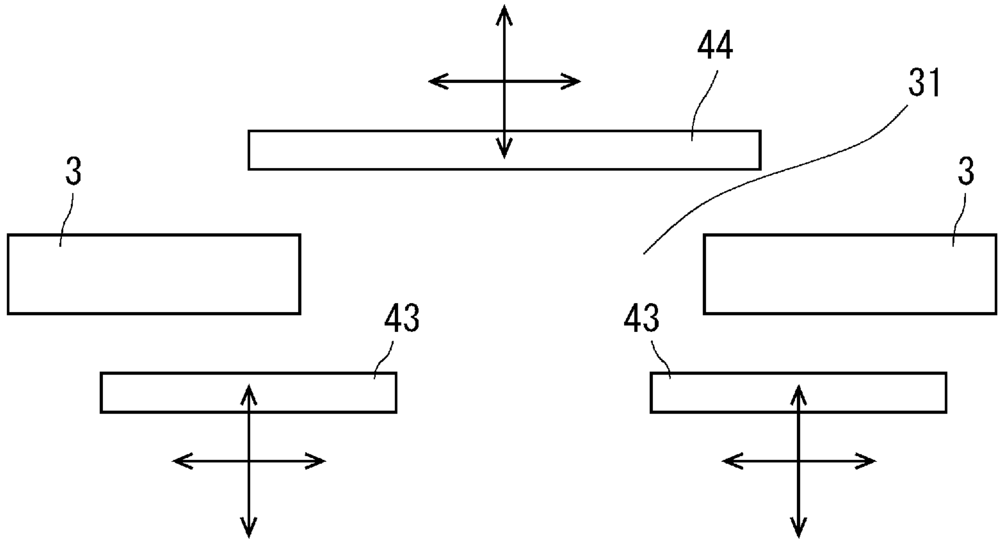
FIG. 5 is a schematic diagram showing a side view of a configuration in which a moveable member is displaced three-dimensionally.
Figure 6:
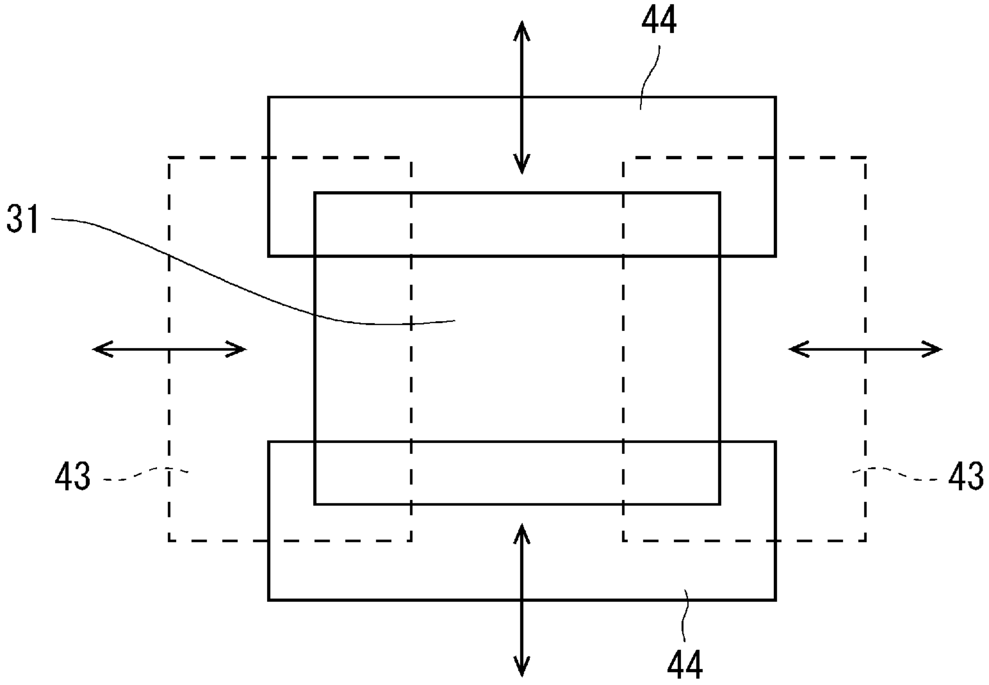
FIG. 6 is a schematic diagram showing a top view of a configuration in which a moveable member is displaced three-dimensionally.

FIG. 5 is a schematic diagram showing a side view of a configuration in which a moveable member is displaced three-dimensionally. FIG. 6 is a schematic diagram showing a top view of a configuration in which a moveable member is displaced three-dimensionally. The MEMS mechanism 5 may change the aperture shape of the opening part 31 by displacing the moveable member 4 three-dimensionally, thereby changing the resonance conditions of the moveable member 4 and the opening part 31.

The moveable member 4 has a first moveable member 43 provided on the lower side of the opening part 31 of the metasurface 3 so as to cover at least a part of the opening part 31 from the lower side thereof, and a second moveable member 44 provided on the upper side of the opening part 31 so as to cover at least a part of the opening part 31 from the upper side thereof.

The MEMS mechanism 5 changes the aperture shape of the opening part 31 three-dimensionally and changes the resonance conditions of the first and the second moveable members 43 and 44 and the opening part 31 by moving the first and the second moveable members 43 and 44 in a parallel direction with respect to the opening part 31.

The MEMS mechanism 5 may change the aperture shape of the opening part 31 by moving the first and the second moveable members 43 and 44 in a vertical direction with respect to the opening part 31, thereby changing the resonance conditions of the first and the second moveable members 43 and 44 and the opening part 31. In addition, the MEMS mechanism 5 may change the aperture shape of the opening part 31 by moving the first and the second moveable member 43 and 44 in a parallel direction and a vertical direction with respect to the opening part 31, thereby changing the resonance conditions of the first and the second moveable members 43 and 44 and the opening part 31.

Figure 7:
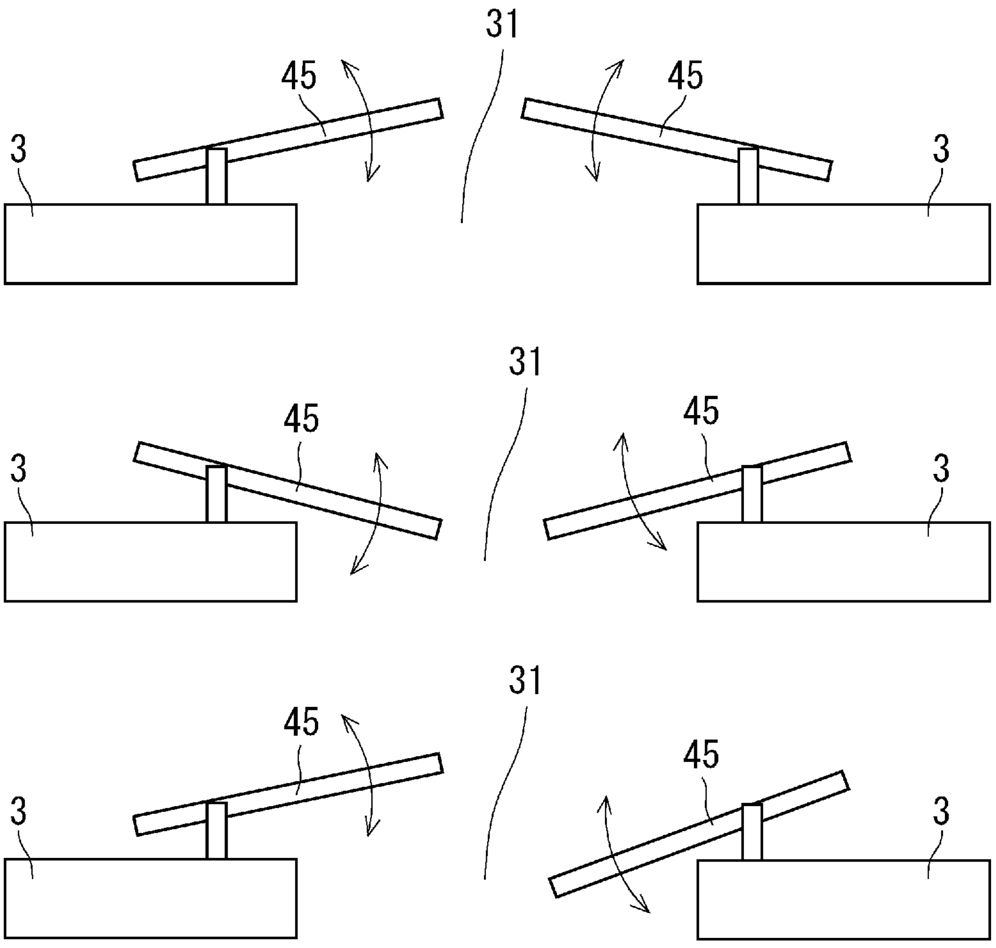
FIG. 7 is a diagram showing a configuration in which an aperture shape of an opening part is changed using cantilevers.

FIG. 7 is a diagram showing a configuration in which an aperture shape of the opening part 31 is changed using cantilevers. The moveable member 4 may have a cantilever 45 provided in the opening part 31 of the metasurface 3 so as to cover at least a part of the opening part 31. The MEMS mechanism 5 changes the aperture shape of the opening part 31 by sliding the cantilever 45, thereby changing the resonance conditions of the cantilever 45 and the opening part 31. The MEMS mechanism 5 uses the leverage principle of the cantilever 45 to increase the moving distance of the moveable parts of the cantilever 45 and to change the aperture shape of the opening part 31 more efficiently.

Second Example Embodiment

Figure 8:
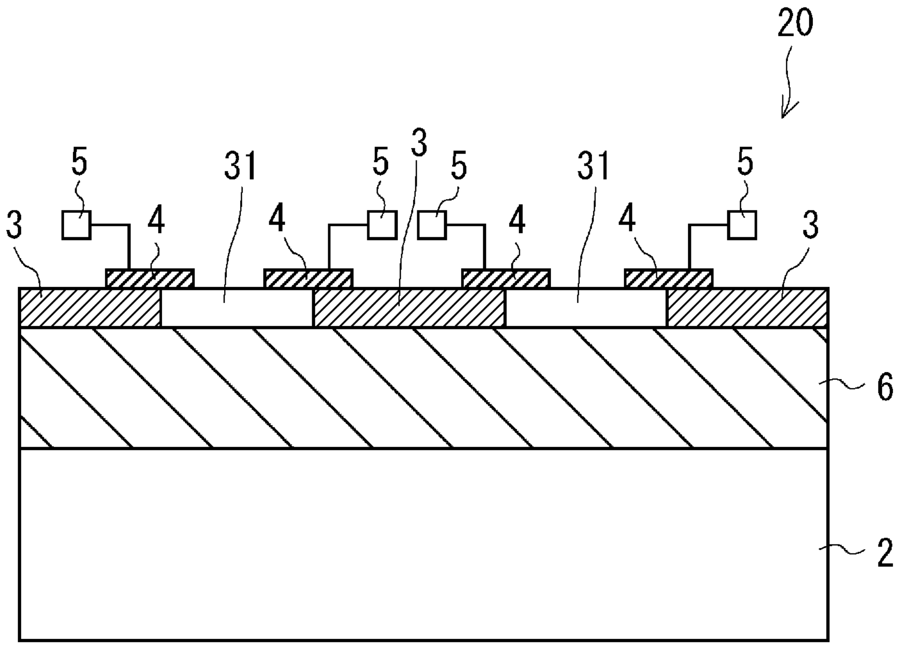
FIG. 8 is a diagram showing a schematic configuration of an antenna according to an example embodiment.

FIG. 8 is a diagram showing a schematic configuration of an antenna according to a second example embodiment. An antenna 20 according to this example embodiment may further include a liquid crystal layer 6 provided on the traveling wave tube 2 in the configuration of the aforementioned example embodiment. The metasurface 3 may be provided on the liquid crystal layer 6. For example, impedance matching may be performed by controlling the deflection of the liquid crystal of the liquid crystal layer 6.

In the present example embodiment, rough phase modulation can be performed by controlling the liquid crystal layer 6. Furthermore, minute phase modulation can be performed by operating the moveable member 4 using the MEMS mechanism 5 and changing the aperture shape of the opening part 31. By performing such two-stage phase modulation, high-speed and high-precision beamforming can be performed.

The metasurface 3 according to the aforementioned example embodiment is provided on the traveling wave tube 2, but it is not limited thereto. For example, the metasurface 3 may be provided on a highly directional antenna. More specifically, a plurality of highly directional micro-antennas may be arranged and the metasurface 3 may be provided on the antennas. The electromagnetic waves from the highly directional antennas may be subjected to high-speed beamforming by controlling the aperture shape of the opening part 31 of the metasurface 3 as described above.

The antenna 1 according to the aforementioned example embodiment can be utilized in a case where the antenna is to transmit electromagnetic waves, but it is not limited to this. That is, the antenna 1 according to the present example embodiment can also be utilized in a case where the antenna is to receive electromagnetic waves.

In the aforementioned example embodiment, an impedance-matching layer for performing impedance matching may be provided between the traveling wave tube 2 and the metasurface 3. The impedance-matching layer is composed of, for example, a conductor whose resistance can be changed. This impedance-matching layer allows for easy impedance matching.

While several example embodiments of the present disclosure have been described, they are presented as examples and are not intended to limit the scope of present disclosure. These noble example embodiments can be implemented in a variety of other forms, and various omissions, replacements, and modifications can be made to the extent that they do not deviate from the gist of present disclosure. These and other variations are included in the scope and the gist of present disclosure and are equally within the scope of present disclosure described in the claims and the equivalents thereof.

This application is based upon and claims the benefit of priority from Japanese patent application No. 2021-056223, filed on Mar. 29, 2021, the disclosure of which is incorporated herein in its entirety by reference.

REFERENCE SIGNS LIST

1 ANTENNA
2 TRAVELING WAVE TUBE
3 METASURFACE
4 MOVEABLE MEMBER
5 MEMS MECHANISM
6 LIQUID CRYSTAL LAYER
31 OPENING PART
41 FIRST MOVEABLE PART
42 SECOND MOVEABLE PART
43 FIRST MOVEABLE MEMBER
44 SECOND MOVEABLE MEMBER
45 CANTILEVER

What is claimed is:

1. An antenna comprising:

a metasurface having an opening part that receives electromagnetic waves; and a MEMS mechanism configured to change a shape of the opening part by operating a moveable member with respect to the opening part of the metasurface, wherein the moveable member has a cantilever provided in the opening part of the metasurface so as to cover at least a part of the opening part, and the MEMS mechanism is configured to change an aperture shape of the opening part by sliding the cantilever, thereby changing resonance conditions of the moveable member and the opening part.

2. The antenna according to claim 1, further comprising a traveling wave tube through which electromagnetic waves travel, wherein the metasurface is provided on the traveling wave tube.

3. The antenna according to claim 2, wherein an impedance matching layer for performing impedance matching is provided between the traveling wave tube and the metasurface.

4. The antenna according to claim 1, wherein the metasurface is provided on a liquid crystal layer.

5. A beam forming method comprising changing an aperture shape of an opening part by moving a moveable member with respect to an opening part of a metasurface using a MEMS mechanism, thereby changing resonance conditions of the opening part and the moveable member and changing an electromagnetic radiation pattern radiated from the opening part, wherein the moveable member has a cantilever provided in the opening part of the metasurface so as to cover at least a part of the opening part, and the MEMS mechanism is configured to change the aperture shape of the opening part by sliding the cantilever, thereby changing the resonance conditions of the moveable member and the opening part.

* * * * *